Aug. 12, 1941.  E. H. PIRON  2,251,950
CANTILEVER TYPE TRUCK
Filed Dec. 23, 1938   2 Sheets-Sheet 1
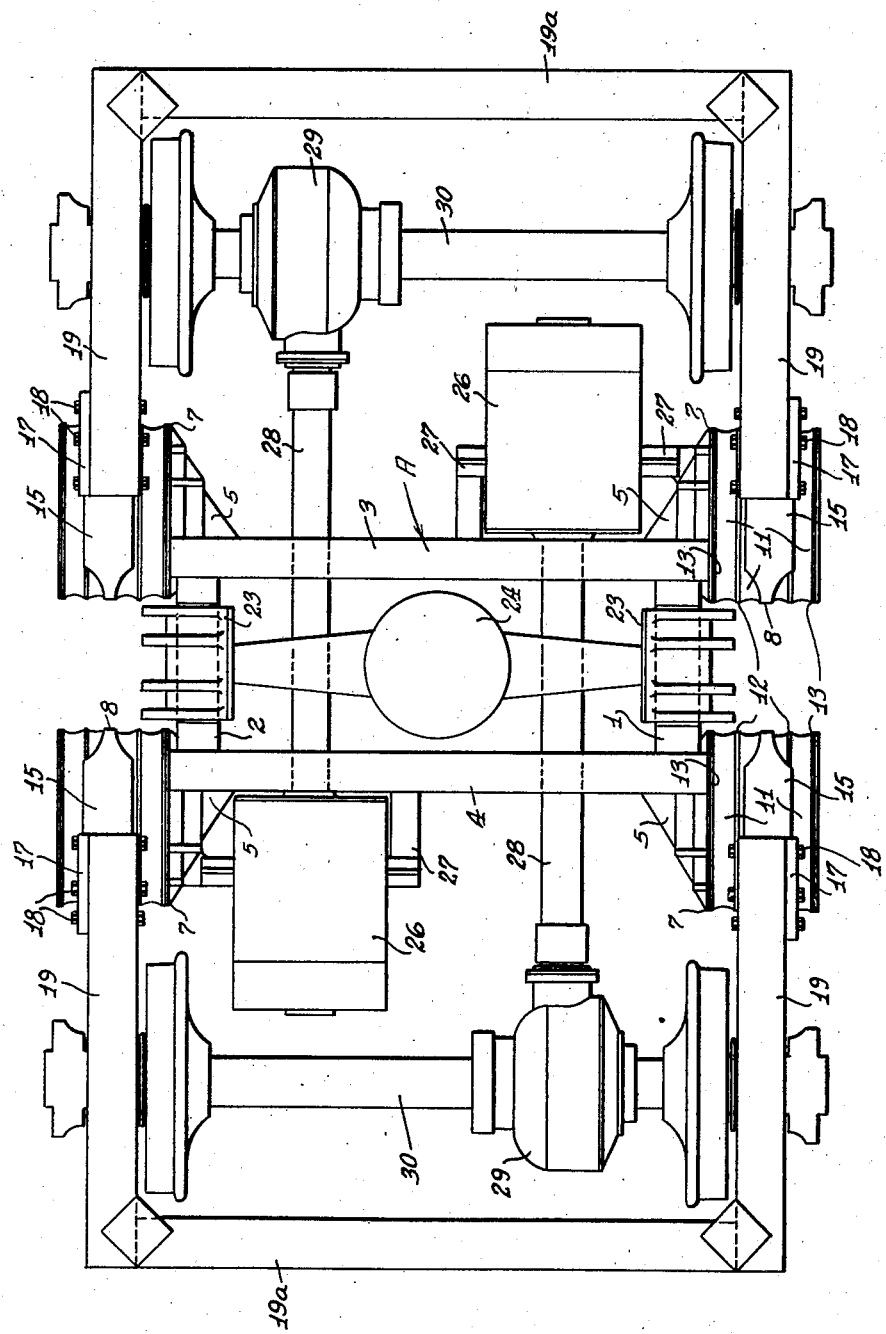
Fig. 1.
INVENTOR.
Emil H. Piron
BY 
ATTORNEY.

Aug. 12, 1941.  E. H. PIRON  2,251,950
CANTILEVER TYPE TRUCK
Filed Dec. 23, 1938  2 Sheets-Sheet 2
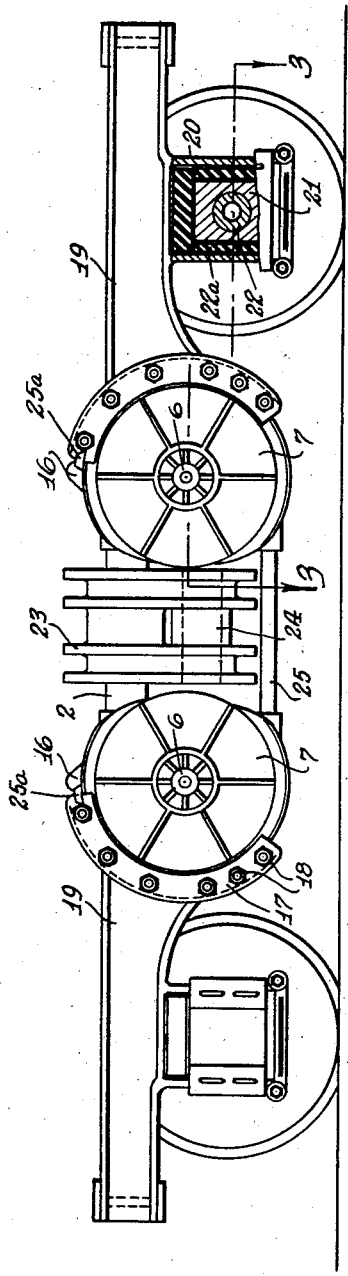
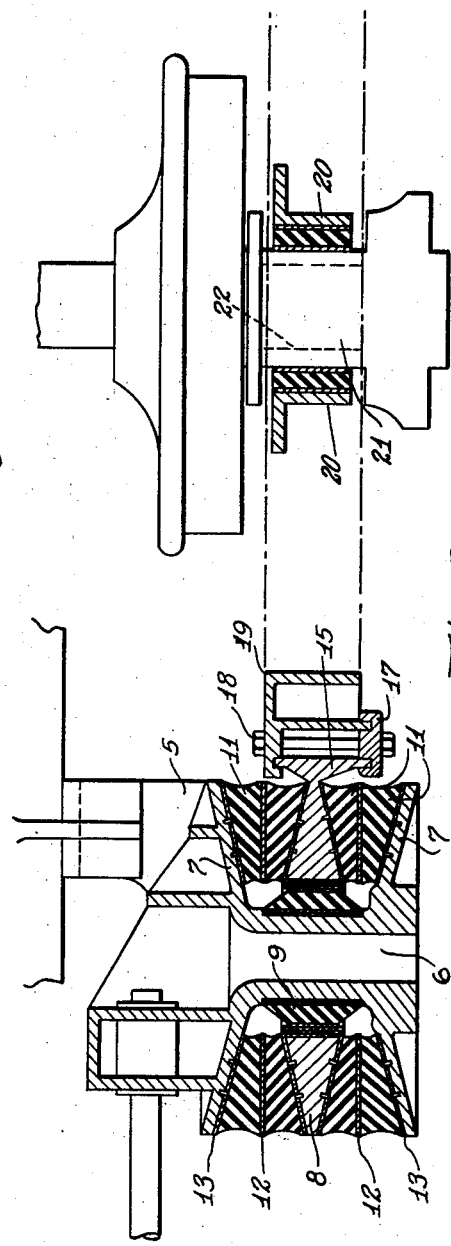
INVENTOR.
Emil H. Piron
BY
ATTORNEY.

Patented Aug. 12, 1941

2,251,950

UNITED STATES PATENT OFFICE 2,251,950

CANTILEVER TYPE TRUCK

Emil H. Piron, New York, N. Y., assignor to Transit Research Corporation, a corporation of New York Application December 23, 1938, Serial No. 247,438

10 Claims. (Cl. 105—182)

This invention relates to rail trucks and has for its object to provide a truck suitable particularly for high speed operation and in which all distortions are elastically resisted.

In cases where distortions cause changes in the relative clearances between truck parts, there is no restoration of the parts to proper relative position upon removal or cessation of the distorting forces, whereas when free clearances are obviated entirely in favor of closed fittings in some instances and in favor of elastic connections in the remaining instances, potential energy will be accumulated in elastic distortions and will restore the parts to correct relative positions upon cessation of the distorting forces. An object of this invention is to provide a high speed truck having swing links constructed and arranged to transmit all driving and retarding forces between a truck frame and the car body supported thereon in combination with elastic connections between all relatively movable parts of the truck except the swing link and swing bolster assembly, which are connected by means of closed fittings.

A further object is to provide a truck which provides for limited fore and aft distortions against elastic media, lateral distortions limited in a similar way to a degree equal to that provided for fore and aft distortions and with vastly increased vertical distortions, the difference between the two degrees of distortion being of the order of fifty to one. For example, distortions in a horizontal direction may be elastically limited to ¼ inch in cases where vertical springing movements between 12 and 14 inches are desirable.

Another object is to provide a truck in which vertical distortions are resisted by springs composed of an elastic plastic material, such as rubber, acting in torsional shear and being so connected that the vertical distortions under the action of maximum lateral forces due to centrifugal action while rounding curves or to side winds will be partially transferred from the springs at one side of the truck to those at the other side by equalizing means which will limit to a predetermined amount the differential of the vertical deflections at opposite sides of the truck when the lateral distortions approach a maximum due to centrifugal action while rounding curves or when side winds are encountered.

More particularly it is an object to provide a main frame having axle suspensory arms projecting therefrom at each corner and connected thereto by elastic plastic springs acting in torsional shear in combination with universal connections preferably in the form of elastic plastic means connecting the axles to the suspensory arms, these universal connections elastically yielding to a very limited extent so that the possible deflections thereof are below the range usually referred to as springing movements.

A further object is to provide a truck frame having axle suspensory arms connected thereto, as above described, and with the further feature of adjustability in a vertical arc in order that the position of all arms may be adjusted individually during initial assembly and also after the springing material has taken a set.

A further object is to provide a novel spring composed of elastic elements subjected to torsional shear by relative rotation through a vertical arc of load imposing and load receiving members in combination with an elastic mass between said members adapted to oppose relative radial movements thereof in compression.

Another object is to provide an improved type of swing link capable of movements with respect to the frame which supports it only through an arc normal thereto and having bearing surfaces such that wear is negligible even without lubrication.

Other objects and advantages will become more fully apparent as reference is had to the accompanying drawings wherein my invention is illustrated, and in which:

Fig. 1 is a top plan view of my improved truck;

Fig. 2 is a side elevation thereof, partially broken away, and

Fig. 3 is a horizontal section taken along the line 3—3 of Fig. 2.

The main frame unit

More particularly, A indicates the main frame unit or component which is composed of two side rails 1 and 2 and two cross members 3 and 4 integrally secured together to form a thoroughly rigid rectangular structure which is further rigidified by its rectangular shape in side elevation, as seen in Fig. 2 and as more fully described hereinafter. To each of the side rails 1 and 2 swing links 23, in which a swing bolster 24 is pivotally mounted, are pivotally connected in such manner that they always swing along the same arc, that is, the swing links cannot move axially along the side rails and the cross members 3 and 4, therefore, do not comprise what is ordinarily termed a transom.

The main springs

Projecting laterally from each corner of the main frame A is a spring perch 5 which is composed of a hub 6 having diverging circular wall members 7 radiating therefrom. Concentric with and of greater internal diameter than the outside diameter of said hubs is a circular disc 8, preferably made of metal, and frusto-conical in any radial cross section, the large base thereof being inward and separated from the hub 6 by a sleeve 9 of elastic plastic material, such as rubber, the sleeve being anchored to the hub and the disc as for instance by surface-bonding to metallic cylinders which are dowelled or otherwise secured to the respective members. The discs 8 are each separated from the sidewalls 7 by elastic masses or discs of rubber 11, the sidewalls of each of which diverge radially outwardly so that the shear stresses will be distributed substantially uniformly throughout. These masses are of multiple unit construction with intermediate stiff discs 12 interposed for purposes of stability, and the outside walls thereof are surface-bonded to stiff discs 13 which are dowelled to the sidewalls 7 and to the large disc 8, respectively. The lower portions of the spring perches 5 are connected by frame rigidifying struts 25 which reside slightly below the bottom of the swing links 23.

The axle suspensory units

The discs 8 are each provided with a peripheral flange 15 which is shown here as being substantially greater than 180° in extent, the exact extent being of no great importance. Arising from each flange 15 is a notched lug 16. Secured to each flange 15 by means of a clamping plate 17 and a plurality of bolts 18 is an axle suspensory arm or lever 19 having pedestals 20 to receive bearings 21 in which the truck axles 22 are journalled. The bearings 21 are separated from the sides or jaws and top of the pedestal by cushions 22 of elastic material which has small resiliency and which serves particularly as a universal connecting means having sound-deadening qualities. The arms 19 extend substantially outwardly beyond the journals and are connected together in pairs at their outer ends by cross members 19a which act as equalizer bars so that movement by one arm 19 will be transmitted, in a measure, to the arm 19 at the other side of the truck.

Vertical swinging movements of any arm 19 will cause torsional shear stresses in the spring masses 11 and pure torsional stresses in the masses 9. Relative fore and aft movements of the arms 19 and the hubs 6 are resisted by the combination compression and tension stresses in the masses 9 and to a lesser degree by shear stresses in the masses 11. Relative lateral swinging movements of the arms 19 and their hubs 6 is resisted by the combination compression and tension stresses in all masses 9 and 11. The springs are, therefore, capable of large deflection for vertical springing, the axles 22 being intended to move twelve or fourteen inches, for example, with respect to the frame A, whereas both lateral and fore and aft movements thereof with respect to the frame are intended to be of the order of one-fourth of an inch.

In order to obtain correct positioning of the arms 19 and also in order to provide for adjustment after the elastic masses have taken a set, the clamp plate 17 may be loosened by loosening the nuts on the bolts 18 and the arms 19 rotated around the flanges 15 to a new position. The plates 18 are notched at their end to correspond to the notch in the projection 16 and a key 25a of correct fit inserted therebetween as a guard against slippage of the clamp plate 17 and arm 19 with respect to the flange 15. If keys of exactly correct size are not available shims may be used with an undersized key.

Motor mounting

Since this truck is adaptable for street railway use, motors 26 are shown carried thereby, the motors being relatively reversely placed and both carried by the frame A. For this purpose, motor supports 27 fixedly secured to the spring perches 5 and to the cross members 3 and 4 are provided, the propeller shafts 28 thereof leading to gearing (not shown) in the gear housing 29, these housings being carried by the axle housings 30.

What is claimed is:

1. A rail truck comprising a main frame, axle suspensory arms extending fore and aft from the corners of said frame, means resiliently connecting one end of each arm to said frame in such manner that each arm comprises a cantilever with its free end adapted for movement through a vertical arc, axles connected to the outer ends of said arms, and equalizing bars rigidly connecting the outer ends of arms on opposite sides of said frame in pairs, said equalizer bars being attached to said arms independent of the axle mounting whereby said bars are unaffected by relative movement between the axles and arms.

2. A rail truck comprising a main frame, cantilever axle suspensory arms extending fore and aft of said frame from the corners thereof, masses of elastic material constituting the cantilever mounting for each of said arms on said frame and resisting relative swinging movement of the free ends thereof through vertical arcs in torsional shear, axles connected to the outer ends of said arms, and equalizing bars rigidly connecting the outer ends of arms on opposite sides of said frame in pairs.

3. A rail truck comprising a main frame, cantilever axle suspensory arms extending fore and aft of said frame from the corners thereof, masses of elastic material constituting the cantilever mounting for said arms and connecting each of said arms to said frame and resisting swinging movement of the free ends thereof through vertical arcs in torsional shear, journal bearings having axles rotatable therein, universal connections for said bearings to said arms, and equalizing bars connecting the outer ends of arms on opposite sides of said truck in pairs.

4. A rail truck comprising a main frame, cantilever axle suspensory arms extending fore and aft of said frame from the corners thereof, masses of elastic material constituting the cantilever connection of each of said arms to said frame and resisting swinging movement of the free ends thereof through vertical arcs in torsional shear, journal bearings having axles rotatable therein, elastic universal connections for said bearings to said arms, and equalizing bars connecting the outer ends of the arms on opposite sides of said truck in pairs.

5. A rail truck comprising a main frame, cantilever axle suspensory arms extending fore and aft of said frame from the corners thereof, masses of elastic material constituting the cantilever connection of each of said arms to said frame and comprising the sole means for resisting swinging movement of the free ends thereof through vertical arcs in torsional shear, and comprising the sole means for resisting relative fore and aft movements of said arms in compression, axles elastically connected to the outer ends of said arms, and equalizing bars connecting the arms on opposite sides of said frame in pairs.

6. A rail truck comprising a main frame, cantilever axle suspensory arms extending fore and aft of said frame from the corners thereof, masses of elastic material constituting the cantilever connection of each of said arms to said frame and comprising the sole means for resisting swinging movement of the free ends thereof through vertical arcs in torsional shear and comprising the sole means for resisting relative lateral movements thereof in compression, axles connected to the outer or swinging ends of said arms, and equalizing bars connecting the arms on opposite sides of said frame in pairs.

7. A rail truck comprising a main frame, cantilever axle suspensory arms extending fore and aft of said frame from the corners thereof, masses of elastic material constituting the cantilever connection of each of said arms to said frame and comprising the sole means for resisting swinging movement of the free ends thereof through vertical arcs in torsional shear and resisting all relative horizontal movements thereof in compression, axles elastically connected to the outer ends of said arms, and equalizing bars connecting the arms on opposite sides of said frame in pairs.

8. A rail truck comprising a frame, cantilever axle suspensory arms projecting fore and aft from the corners thereof, springs constituting the cantilever connection of said arms to said frame, said springs each comprising masses of elastic material separated by a stiff disc, said elastic masses being anchored to said frame, said discs each being rotatable through an arc parallel to either direction of travel of the truck to impose shear loading on said elastic masses, said arms each being removably secured to one of said discs.

9. A rail truck comprising a frame, cantilever axle suspensory arms projecting fore and aft from the corners thereof, springs constituting the cantilever connection of said arms to said frame, said springs each comprising masses of elastic material separated by a stiff disc, said elastic masses being anchored to said frame, said discs each being rotatable through an arc parallel to either direction of travel of the truck to impose shear loading on said elastic masses, said discs each having a peripheral flange, each of said arms being removably clamped to one of said flanges at any selected place thereon.

10. A rail truck comprising side rails, cross members rigidly connecting said side rails at the ends thereof, each of said side rails being elastically articulated at two points along the length thereof in such manner that the end portions constitute cantilevers and the mid-portions a rigid support therefor, axles connected to each of the cantilever portions of said side rails substantially intermediate the length thereof, and additional rigid cross members connecting the ends of the mid-portions of said side rails.

EMIL H. PIRON.